(12) United States Patent
Ha et al.

(10) Patent No.: US 12,483,137 B2
(45) Date of Patent: Nov. 25, 2025

(54) MULTI-OUTPUT POWER CONVERSION APPARATUS AND METHOD

(71) Applicants: HYUNDAI MOTOR COMPANY, Seoul (KR); KIA CORPORATION, Seoul (KR)

(72) Inventors: Tae-Jong Ha, Seoul (KR); Dae-Woo Lee, Incheon (KR); Byung-Gu Kang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 215 days.

(21) Appl. No.: 17/842,603

(22) Filed: Jun. 16, 2022

(65) Prior Publication Data
US 2023/0170691 A1 Jun. 1, 2023

(30) Foreign Application Priority Data
Nov. 26, 2021 (KR) .................. 10-2021-0165756

(51) Int. Cl.
*H02M 3/158* (2006.01)
*H02M 1/00* (2007.01)
*H02M 3/335* (2006.01)

(52) U.S. Cl.
CPC ......... *H02M 3/1582* (2013.01); *H02M 1/009* (2021.05); *H02M 1/007* (2021.05); *H02M 3/158* (2013.01); *H02M 3/33538* (2013.01)

(58) Field of Classification Search
CPC .. H02M 1/007; H02M 1/0077; H02M 1/0083; H02M 1/009; H02M 1/0093; H02M 3/158; H02M 3/1582; H02M 3/1588; H02M 3/335; H02M 3/33507; H02M 3/33523; H02M 3/33569; H02M 3/33576; H02J 7/0013; H02J 7/0024; H02J 7/1423; B60L 58/20; B60L 58/21
See application file for complete search history.

(56) References Cited

U.S. PATENT DOCUMENTS

| | | | | |
|---|---|---|---|---|
| 4,480,298 A * | 10/1984 | Fry | ........... | H02M 3/33561 363/128 |
| 6,194,875 B1 * | 2/2001 | Takimoto | ........... | H02M 3/156 320/141 |
| 6,268,666 B1 * | 7/2001 | Bhowmik | ........... | H02J 7/345 323/271 |
| 6,737,756 B1 * | 5/2004 | Gale | ........... | B60L 58/21 307/45 |
| 11,607,968 B1 * | 3/2023 | Ge | ........... | H02J 7/02 |
| 2004/0130214 A1 * | 7/2004 | Murty | ........... | H02J 7/1423 307/66 |

(Continued)

FOREIGN PATENT DOCUMENTS

KR 20210104313 A 8/2021

*Primary Examiner* — Fred E Finch, III
(74) *Attorney, Agent, or Firm* — Lempia Summerfield Katz LLC

(57) ABSTRACT

A multi-output power conversion apparatus capable of integrally operating an auxiliary battery includes a high voltage battery configured to output a first power and a power conversion unit. The power conversion unit is configured to convert the first power into a second power and to convert the second power into a third power with multiple outputs to supply it to each of a plurality of electric part loads with different power consumption magnitudes.

15 Claims, 6 Drawing Sheets

(56) References Cited

U.S. PATENT DOCUMENTS

| | | | |
|---|---|---|---|
| 2005/0151509 A1* | 7/2005 | Cook | B60R 16/033 |
| | | | 320/116 |
| 2008/0116846 A1* | 5/2008 | Greenfeld | H02J 50/10 |
| | | | 320/108 |
| 2015/0183334 A1* | 7/2015 | Bang | B60L 58/20 |
| | | | 307/9.1 |
| 2021/0067047 A1* | 3/2021 | Hudson | B60R 16/033 |
| 2021/0257951 A1 | 8/2021 | Ha et al. | |
| 2022/0105831 A1* | 4/2022 | Valero | B60L 58/20 |
| 2023/0134008 A1* | 5/2023 | Jabez Dhinagar | H02J 7/0013 |
| | | | 320/107 |

* cited by examiner

MULTI-OUTPUT POWER CONVERSION APPARATUS AND METHOD

CROSS-REFERENCE TO RELATED APPLICATION

This application claims priority to Korean Patent Application No. 10-2021-0165756, filed on Nov. 26, 2021, which is incorporated herein by reference in its entirety.

BACKGROUND

Field of the Disclosure

The present disclosure relates to a technology for converting a multi-output power, and more specifically, to an apparatus and a method for converting a multi-output power in an eco-friendly vehicle.

Description of Related Art

A power conversion apparatus in an eco-friendly vehicle to which a high voltage system (400 to 800 V) is applied converts energy of a high voltage battery to operate a driving motor to obtain kinetic energy. In this case, the inverter converts direct current (DC) power into alternating current (AC) power.

Meanwhile, the power conversion apparatus also charges a low voltage battery to supply power to a 12 V electric part load.

With the recent progress of electrification, a power consumption amount is rapidly increasing due to a rapid increase in the electric part load of a vehicle. Therefore, the fuel efficiency and mileage of a vehicle are reduced. In addition, the 12 V electric part tends to gradually change to 48 V according to the application of a high-load system, such as an autonomous driving system.

When the electric part is changed to 48 V, there is an advantage in the reduction of the size and/or the weight, as well as improvement in efficiency. Therefore, high-power components such as an e-super charger are being changed.

To respond to this electric part load, a conventional system responds to the electric part load by performing a conversion from a high voltage to a low voltage at 12 V/48 V, respectively, and by mounting an auxiliary battery for each load.

In other words, the system is composed of a power conversion apparatus and an auxiliary battery corresponding to an electric part load of 12 V/48 V voltage.

In this case, there is a disadvantage in that the size and weight of the system increase. In particular, the overall weight highly or substantially increases due to the mounting of the 48 V auxiliary battery, which serves as a factor in reducing the fuel efficiency of the vehicle.

In addition, when multiple outputs are used for the high voltage-to-low voltage conversion, complexity may increase in an output control with a configuration of two output taps in one transformer. A voltage control for each electric part load is thereby adversely affected.

The contents described in the Description of Related Art are to aid in understanding the background of the present disclosure and may include what is not previously known to those having ordinary skill in the art to which the present disclosure pertains.

SUMMARY

The present disclosure has been proposed to solve the above problems. An object of the present disclosure is to provide a multi-output power conversion apparatus and method, which can integrally operate an auxiliary battery.

In addition, another object of the present disclosure is to provide a multi-output power conversion apparatus and method, which can respond to a broader range of voltage control by improving a power conversion ratio.

In addition, still another object of the present disclosure is to provide a multi-output power conversion apparatus and method, which can reduce the weight.

To achieve the above objects, the present disclosure provides a multi-output power conversion apparatus capable of integrally operating an auxiliary battery.

A multi-output power conversion apparatus includes a high voltage battery configured to output a first power, and a power conversion unit. The power conversion unit is configured to convert the first power into a second power and to convert the second power into a third power with multiple outputs to supply it to each of a plurality of electric part loads with different power consumption magnitudes.

In addition, the power conversion unit includes: a high voltage converter configured to convert the first power into the second power smaller or lower than the first power; and a low voltage conversion module configured to convert the second power into the third power equal to or smaller or lower than the second power.

In addition, the low voltage conversion module includes an integrated converter configured to convert the second power into the third power and an energy storage element configured to store the third power as backup or to supply the stored third power to the plurality of electric part loads.

In addition, the energy storage element is disposed in the integrated converter and one assembly.

In addition, the energy storage element has at least two battery cells with the same chargeable capacity disposed in series to store the third power with the multiple outputs.

In addition, the at least two battery cells are composed of and divided into a first auxiliary battery and a second auxiliary battery using an ON/OFF combination of at least three switching elements.

In addition, the switching element is disposed between the at least two battery cells connected in series.

In addition, the switching element includes: a first switching element disposed between an output terminal of the high voltage converter or an output terminal of the integrated converter and the at least two battery cells; and a second switching element disposed between the first auxiliary batteries or the second auxiliary batteries.

In addition, the second auxiliary battery is connected to a first electric part load with small or low power consumption among the plurality of electric part loads.

In addition, the first auxiliary battery and the second auxiliary battery are connected to a second electric part load with large or high power consumption among the plurality of electric part loads in series.

In addition, the integrated converter is a buck booster type converter.

In addition, the integrated converter includes two switching elements connected in series, an inductor connected to an intermediate node of the two switching elements, and a capacitor connected to the inductor in parallel.

In addition, the high voltage converter is an active clamp-forward type converter for improving efficiency.

On the other hand, another embodiment of the present disclosure provides a multi-output power conversion method that includes outputting a first power from a high voltage battery. The method further includes converting, by a power conversion unit, the first power into a second power and converting, by the power conversion unit, the second power into a third power with multiple outputs. The method also includes supplying, by the power conversion unit, the third power with multiple outputs to a plurality of electric part loads with different power consumption magnitudes.

In addition, the converting includes converting, by a high voltage converter, the first power into the second power smaller or lower than the first power; and converting, by a low voltage conversion module, the second power into the third power equal to or smaller or lower than the second power.

In addition, the converting of the second power includes converting, by an integrated converter, the second power into the third power and storing the third power in an energy storage element as backup or supplying the third power stored in the energy storage element to the plurality of electric part loads.

According to the present disclosure, it is possible to reduce the size and/or weight corresponding to one auxiliary battery by integrating the auxiliary battery compared to the conventional apparatus.

In addition, as another effect of the present disclosure, it is possible to respond to the wide range of voltage control by improving the power conversion ratio. It is also possible to respond to the electric part load using the intermediate level voltage, unlike the conventional apparatus.

In addition, as still another effect of the present disclosure, it is possible to reduce the size of the converter itself, reduce the material cost, and improve efficiency by applying the converter topology with the reduced number of elements.

In addition, as yet another effect of the present disclosure, it is also possible to expect a reduction in magnetic body loss due to the change in the configuration of the transformer.

DESCRIPTION OF SPECIFIC EMBODIMENTS

Figure 1:
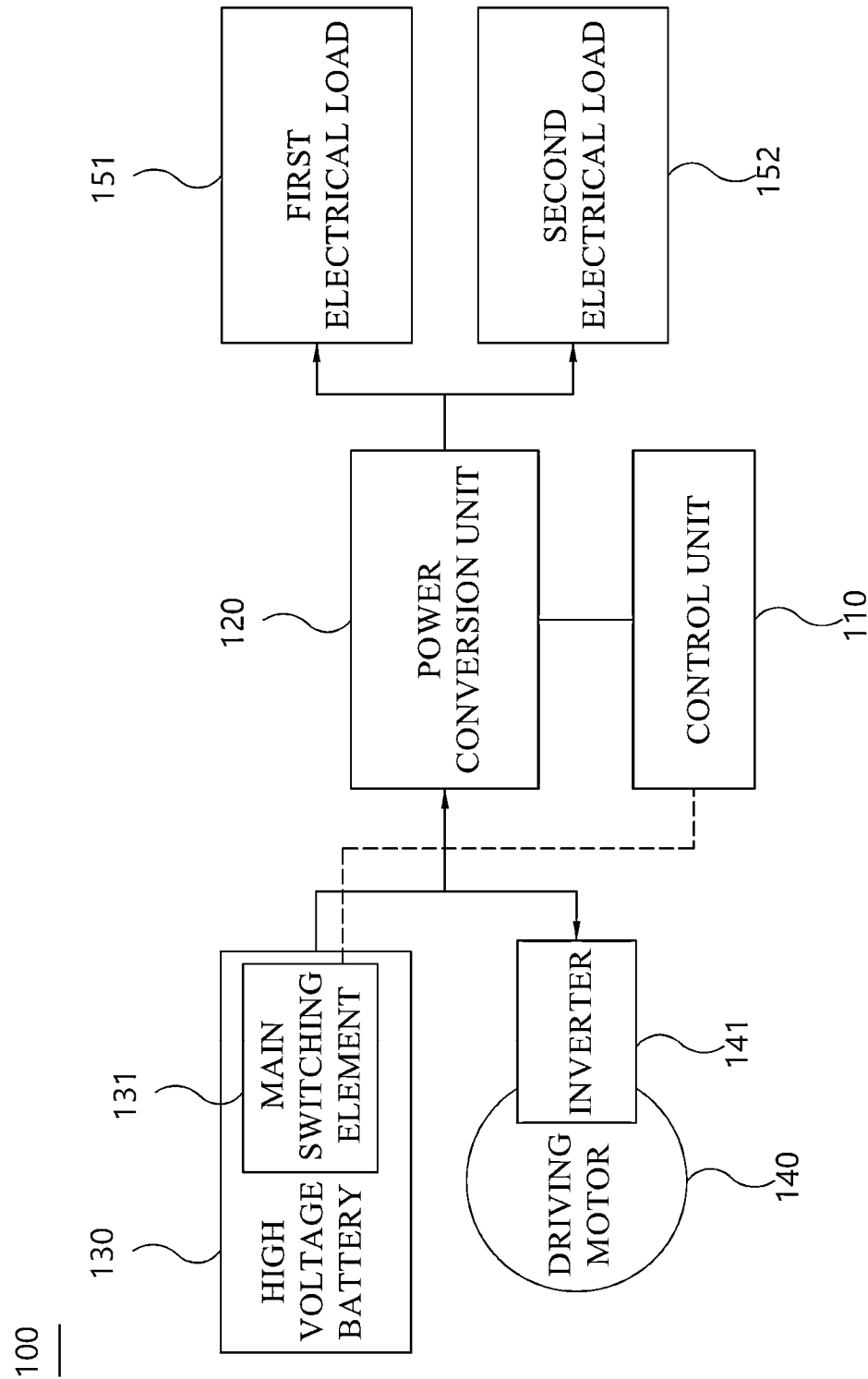
FIG. 1 is a block diagram showing a configuration of a multi-output power conversion apparatus according to an embodiment of the present disclosure.

Since the present disclosure can be variously changed and can have various embodiments, specific embodiments are shown in the drawings and described in detail in the following detailed description. However, it should be understood that this is not intended to limit the present disclosure to specific embodiments. The present disclosure includes all modifications, equivalents, and substitutes included in the spirit and technical scope of the present disclosure.

In describing each drawing, similar components are denoted by similar reference numerals.

Terms such as first, second, and the like can be used to describe various components, but the components should not be limited to the terms. The terms are used only for the purpose of distinguishing one component from another.

For example, a first component can be referred to as a second component, and similarly, a second component can also be referred to as a first component without departing from the scope of the present disclosure. The term "and/or" includes any combination of two or more of a plurality of related listed items or any item of the plurality of related listed items.

Unless defined otherwise, all terms used herein, including technical or scientific terms, have the same meaning as commonly understood by those having ordinary skill in the art to which the present disclosure pertains.

Terms such as those defined in a commonly used dictionary should be interpreted as having a meaning consistent with the meaning in the context of the related art. Such terms should not be interpreted in an ideal or excessively formal meaning unless explicitly defined in the present application.

Hereinafter, a multi-output power conversion apparatus and method according to an embodiment of the present disclosure are described in detail with reference to the accompanying drawings.

FIG. 1 is a block diagram showing a configuration of a multi-output power conversion apparatus 100 according to an embodiment of the present disclosure. Referring to FIG. 1, the multi-output power conversion apparatus 100 can be configured to include a control unit 110, a power conversion unit 120, a high voltage battery 130, a driving motor 140, and electric part loads 151, 152.

The control unit 110 serves to control the power conversion unit 120 to supply power to first and second electric part loads 151, 152. In other words, the control unit 110 controls the power conversion unit 120 according to a command based on a driver's operation of electric parts or a request from a vehicle system to supply power differently to the first electric part load 151 and/or the second electric part load 152.

For example, about 48 V can be supplied to the first electric part load 151 and about 12 V can be supplied to the second electric part load 152. To this end, the control unit 110 can be configured as a microprocessor, a modulation circuit, and the like. A modulation can be a pulse width modulation (PWM) but is not limited thereto. Different modulations such as a pulse frequency modulation (PFM) can also be used.

The power conversion unit 120 serves to convert a high voltage power from the high voltage battery 130 into a multi-low voltage power to supply it to the first electric part load 151 and/or the second electric part load 152. The high voltage power is generally about 400 to 800 V and the low voltage power is about 10 to 54 V.

In particular, the power conversion unit 120 converts the high voltage power into the low voltage power two times (i.e., twice). In other words, the power conversion unit 120 converts the high voltage power into a higher primary low voltage power and converts this into a low secondary low voltage power. For example, when the high voltage power is about 400 V, the primary low voltage power can be about 60 V and the secondary low voltage power can be 12 V or 48 V.

The high voltage battery 130 is charged with the high voltage power. The high voltage power charged and stored in the high voltage battery 130 is supplied to the power conversion unit 120 and/or the driving motor 140 by turning ON/OFF a main switching element 131.

A power relay may be used as the main switching element 131, but the present disclosure is not limited thereto. For example, a semiconductor switching element such as a field effect transistor (FET), a metal oxide semiconductor FET (MOSFET), an insulated gate bipolar mode transistor (IGBT), a power rectifying diode, a thyristor, a gate turn-off (GTO) thyristor, a triode for alternating current (TRIAC), a silicon controlled rectifier (SCR), an integrated circuit (IC), and the like can be used. In particular, for the semiconductor element, a bipolar transistor, a power metal oxide silicon field effect transistor (MOSFET) element, and the like can be used. The power MOSFET element performs a high-voltage and high-current operation and has a double-diffused metal oxide semiconductor (DMOS) structure, unlike the general MOSFET.

The high voltage battery 130 has battery cells (not shown) configured in series and/or in parallel. This battery cell can be a high-voltage battery cell for an electric vehicle such as a nickel metal battery cell, a lithium ion battery cell, a lithium polymer battery cell, a lithium sulfur battery cell, a sodium sulfur battery cell, or an all-solid-state battery cell, and the like.

The main switching element 131 can also be configured to be included in the high voltage battery 130 or can also be configured separately from the high voltage battery 130.

As the driving motor 140, a three-phase alternating current (AC) motor is mainly used, but the present disclosure is not limited thereto. Additionally, a three-phase DC motor, a three-phase brushless direct current (BLDC) motor, and the like can be used. The driving motor 140 can be composed of a stator (not shown) and a rotor (not shown) rotated by the stator (not shown).

Further, an inverter 141 is configured to supply AC power to the driving motor 140. The inverter 141 serves to convert the DC high voltage power supplied from the high voltage battery 130 into the AC power.

A pulse width modulation (PWM) inverter, which is a voltage-type inverter, is used, but the present disclosure is not limited thereto. Additionally, a current-type inverter can also be applied in a manner of modifying some components. The PWM inverter simultaneously controls a voltage and a frequency using a pulse width modulation (PWM) control method for the rectified DC voltage.

The inverter 141 can also be configured to be included in the driving motor 140 or can also be configured separately.

The first and second electric part loads 151, 152 are components installed in the vehicle. The first and second electric part loads 151, 152 can be a lamp, a heater, a navigation system, an audio system, a camera, and a motor. In addition, the electric part loads 151, 152 can use different power consumption. For example, the first electric part load 151 can be about 48 V and the second electric part load 152 can be about 12 V.

Figure 2:
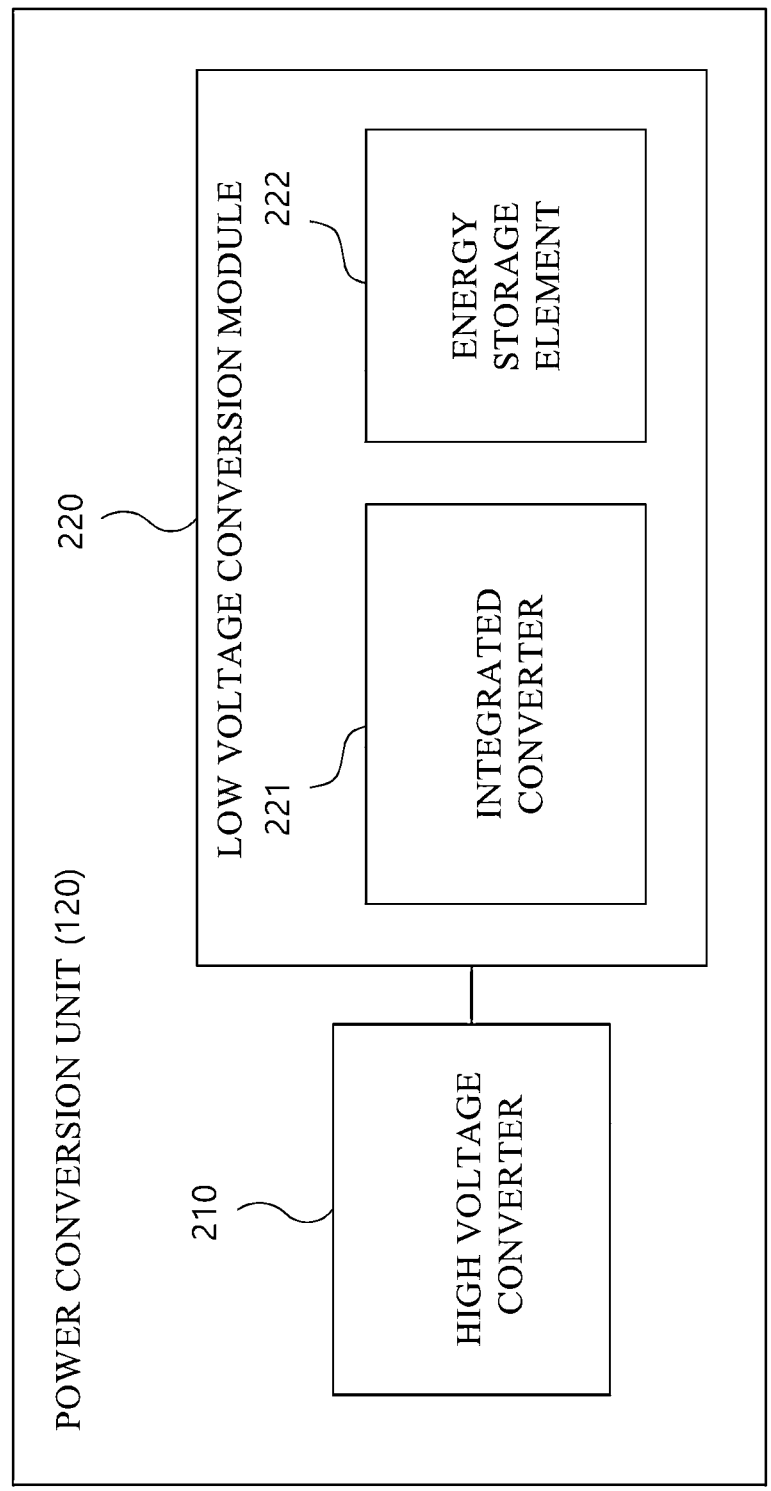
FIG. 2 is a block diagram of a detailed configuration of a power conversion unit shown in FIG. 1.

FIG. 2 is a block diagram of a detailed configuration of the power conversion unit 120 shown in FIG. 1. Referring to FIG. 2, the power conversion unit 120 can be composed of a high voltage converter 210 and a low voltage conversion module 220. The high voltage converter 210 serves to convert the high voltage power into a primary low voltage power. The high voltage converter 210 is a direct current-direct current (DC-DC) converter.

The high voltage converter 210 has, for example, an insulating structure that converts the high voltage power of about 400 to 800 V into the low voltage power of about 60 V or less. In other words, the insulating structure is a structure in which an input power and an output power are not connected to each other.

The low voltage conversion module 220 can be composed of an integrated converter 221 and an energy storage element 222 configured to store the output power that is output by the integrated converter 221. The integrated converter 221 serves to convert the primary low voltage power into a secondary low voltage power. To this end, the integrated converter 221 is a direct current-direct current (DC-DC) converter.

The integrated converter 221 converts the low voltage power of about 60 V or less into the low voltage power of about 10 to 16 V or about 24 to 54 V lower than the above low voltage power.

The energy storage element 222 serves to store the secondary low voltage power converted by the integrated converter 221. Therefore, the energy storage element 222 can be used for power source backup of the electric part loads 151, 152. Of course, the secondary low voltage power stored in the energy storage element 222 can be discharged to the electric part loads 151, 152.

In addition, although the integrated converter 221 and the energy storage element 222 appear to be separated in configuration, they are positioned in one assembly in the integrated configuration and operated. Further, it is also possible to configure the high voltage converter 210, the integrated converter 221, and the energy storage element 222 in the integrated configuration.

Therefore, according to an embodiment of the present disclosure, the size of the system can be reduced and the efficiency can be increased by integrating the auxiliary battery, unlike in the case where the auxiliary battery is configured to regulate each of the different voltage outputs (12 V/48 V) and secure stability.

Figure 3:
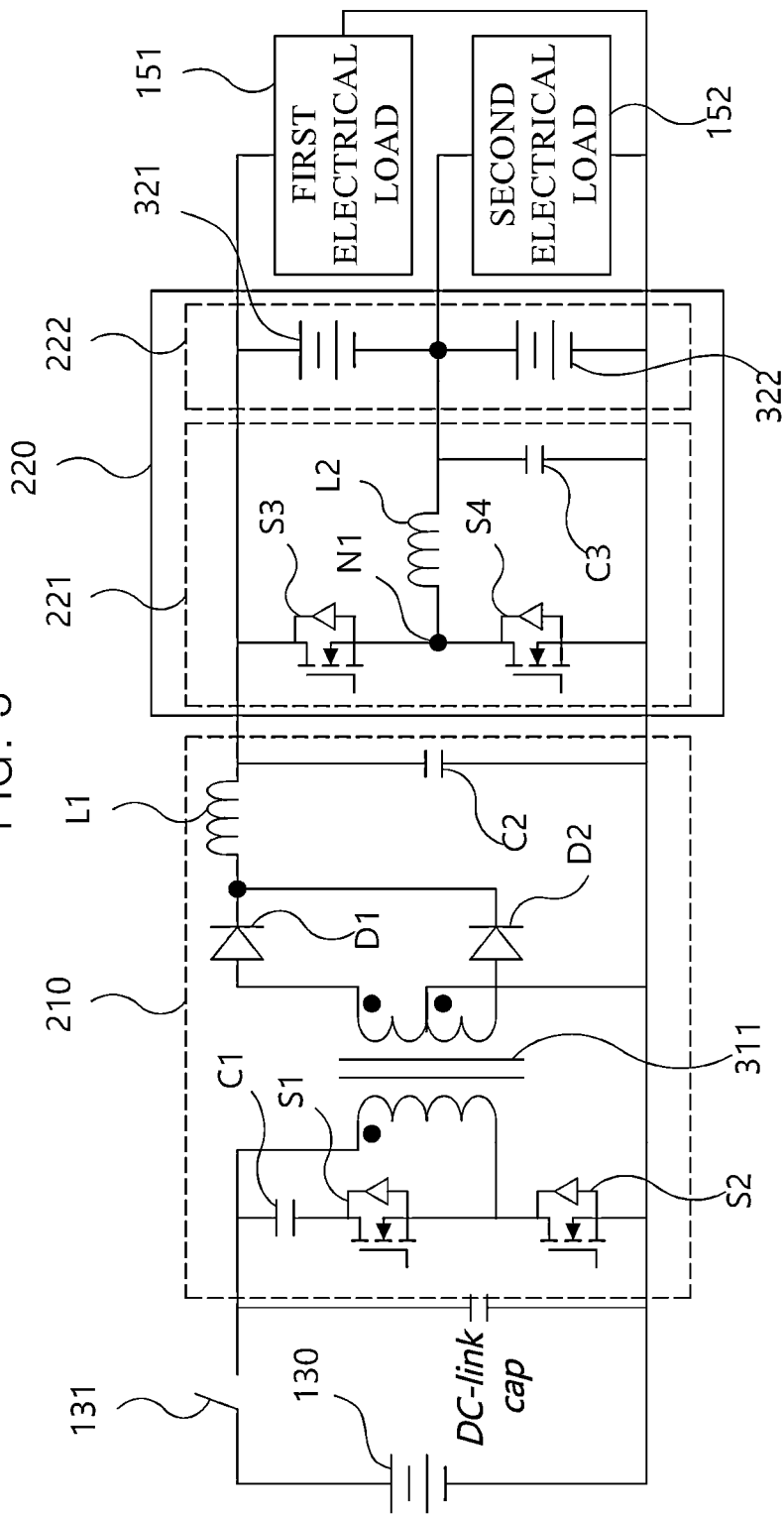
FIG. 3 is a circuit example of the power conversion unit shown in FIG. 1.

FIG. 3 is a circuit example of the power conversion unit 120 shown in FIG. 1. Referring to FIG. 3, the main switching element 131 is disposed on an output terminal of the high voltage battery 130. An inverter DC link capacitor (DC-link cap) serves to help or aid the DC power and the AC power to be smoothly exchanged in the inverter (141 in FIG. 1).

The high voltage converter 210 uses an active clamp-forward method to improve efficiency. To this end, the high voltage converter 210 can be configured to include: a first capacitor (C1) connected to the high voltage battery 130 in parallel and being a clamp capacitor; a first switching element (S1) connected to the first capacitor (C1) in series; a second switching element (S2) connected to the first switching element (S1) in series; a transformer 311 connected to the high voltage battery 130 in parallel; a first diode (D1) and a second diode (D2) connected to an output terminal of a secondary winding of the transformer 311 in parallel; a first inductor (L1) connected to an output terminal of the first diode (D1) and the second diode (D2); and a second capacitor (C2) connected to the first inductor (L1) in parallel.

The first capacitor (C1) prevents damage when the second switching element (S2) is turned off. In other words, when the second switching element (S2) is turned off, the first capacitor (C1) serves to store the energy stored in a primary winding of the transformer 311. In this case, the first switching element (S1) is turned off.

The first diode (D1) and the second diode (D2) serve to convert the AC power output to the secondary winding of the transformer 311 into the DC power. In other words, the first diode (D1) and the second diode (D2) perform a rectifying function.

If the active clamp-forward type converter is used, the number of switching elements is reduced. Therefore, it is possible to reduce the material cost and/or the size together.

The low voltage conversion module 220 is composed of the integrated converter 221 and the energy storage element 222. A buck booster type converter can be used as the integrated converter 221, and in particular, an inverting buck booster type converter can be used. For example, the integrated converter 221 can be configured to include: a third switching element (S3) connected to the second capacitor (C2) configured to generate an output voltage in parallel; a fourth switching element (S4) connected to the third switching element (S3) in series; a second inductor (L2) connected to an intermediate node (N1) of the third switching element (S3) and the fourth switching element (S4); and a third capacitor (C3) connected to the second inductor (L2) in series.

The energy storage element 222 is a type in which a plurality of battery cells is connected in series and is divided and configured to respond to various output voltages. In other words, the energy storage element 222 can be divided into and composed of a first auxiliary battery 321 and a second auxiliary battery 322. The first auxiliary battery 321 is configured to supply power to the first electric part load 151 and the second auxiliary battery 322 is configured to supply power to the second electric part load 152.

The first auxiliary battery 321 and the second auxiliary battery 322 are integrated into the same one type and connected in series. In other words, the first auxiliary battery 321 and the second auxiliary battery 322 can be composed of the same 12 V battery cells.

Therefore, the 48 V electric part load 151 can use both the first auxiliary battery 321 and the second auxiliary battery 322. Further, the 12 V electric part load 152 can use only the second auxiliary battery 322.

The auxiliary batteries 321, 322 can be composed of a chargeable battery cell, a super capacitor, and the like.

Continuously referring to FIG. 3, the relationship between the output voltage and the input voltage is as follows.

$$\frac{V_o}{V_i} = n \cdot D_1 \cdot \frac{D_2}{1 - D_2} \quad \text{Equation 1}$$

Referring to Equation 1, Vo refers to the output voltage, Vi refers to the input voltage, n refers to a turn ratio of the transformer, $D_1$ refers to a duty ratio of the high voltage converter, and $D_2$ refers to a duty ratio of an integrated converter.

The duty ratios ($D_1$, $D_2$) can be simply expressed as in Equation 2 below, except for the turn ratio (n).

$$D_1 = \frac{V_{O1}}{V_i} \quad \text{Equation 2}$$
$$D_2 = \frac{V_{O2}}{V_{O2} + V_i}$$

Referring to Equation 2, $V_{O1}$ refers to the output of the high voltage converter, and $V_{O2}$ refers to the output of the integrated converter.

Therefore, it is possible to respond to variations in voltages $V_{O1}$ and $V_{O2}$ to different voltages due to the characteristics of the buck booster converter topology.

In addition, it is possible to output a broader voltage range by adjusting the ON or OFF time of the third switching element (S3) and the fourth switching element (S4). In other words, in general, a main operating range of the 12 V electric part load 152 side is limited to about 10 to 16 V. In addition, a main operating range of the 48 V first electric part load 151 side is limited to about 25 to 54 V. Outside this main operating range, normal output limitation or derating occurs.

In contrast, according to the embodiment of the present disclosure, it is possible to respond to and control the broader voltage range by adjusting the ON or OFF operating times of the third switching element (S3) and the fourth switching element (S4) to change the duty ratio thereof.

In other words, not only the two voltages of 12 V/48 V, but also the intermediate voltage level, such as 24 V, can be output without adding and/or modifying hardware (H/W).

Figure 4:
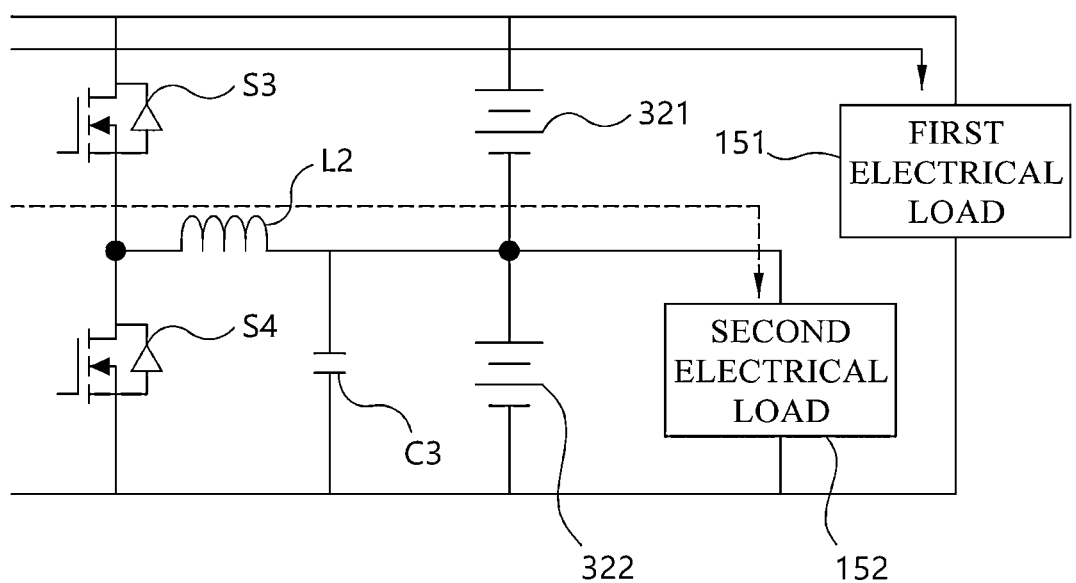
FIG. 4 is a diagram showing a power flow in the circuit shown in FIG. 3.

FIG. 4 is a diagram showing a power flow in the circuit shown in FIG. 3. Referring to FIG. 4, if both the third switching element (S3) and the fourth switching element (S4) are turned off, the output voltage generated by the capacitor (C2) is supplied to the 48 V first electric part load 151 as indicated by a solid arrow. In other words, when the output voltage generated by the capacitor (C2) is maintained to be higher than the output voltages of the auxiliary batteries 321, 322, it is then directly supplied toward the electrical part loads 151, 152.

In contrast, by adjusting the ON or OFF operating times of the third switching element (S3) and the fourth switching element (S4) to change the duty ratio thereof, the output voltage generated by the capacitor (C2) is reduced and supplied to the 12 V electric part load 152 as indicated by a dotted arrow.

FIG. 4 is shown to aid in understanding the charging of the auxiliary batteries 321, 322, and to show that the voltage supply to the electric part loads 151, 152 can also be simultaneously performed.

Figure 5:
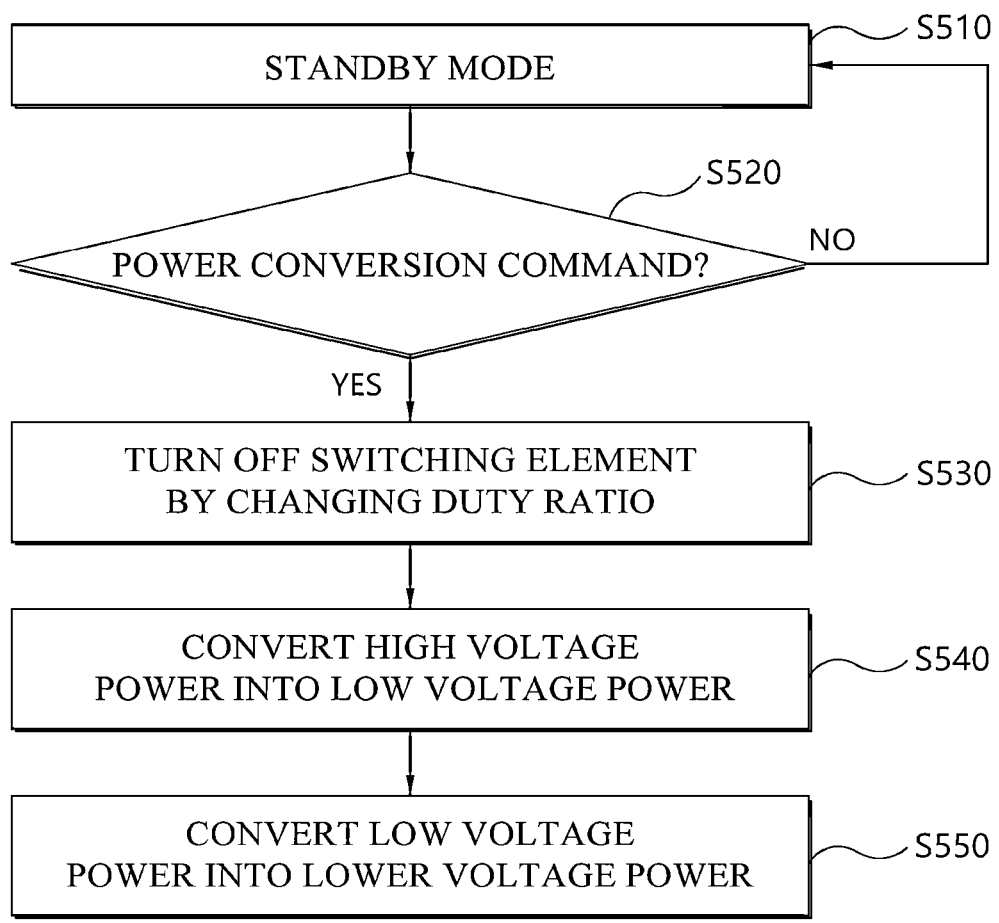
FIG. 5 is a flowchart showing a multi-output power conversion process according to the embodiment of the present disclosure.

FIG. 5 is a flowchart showing a multi-output power conversion process according to the embodiment of the present disclosure. Referring to FIG. 5, the control unit 110 is in a standby mode (step S510).

In this standby mode, the control unit 110 confirms whether there is a power conversion command according to a command based on the driver's operation of electric parts or a request from the vehicle system (step S520).

In step S520, when there is no power conversion command, it proceeds to step S510.

In contrast, in step S520, when there is the power conversion command, the control unit 110 changes the duty ratio, and turns ON/OFF the switching element according to the duty ratio (step S530).

Thereafter, the high voltage power is converted into the low voltage power and the low voltage power is converted into a lower low voltage power again (steps S540 and S550).

Figure 6:
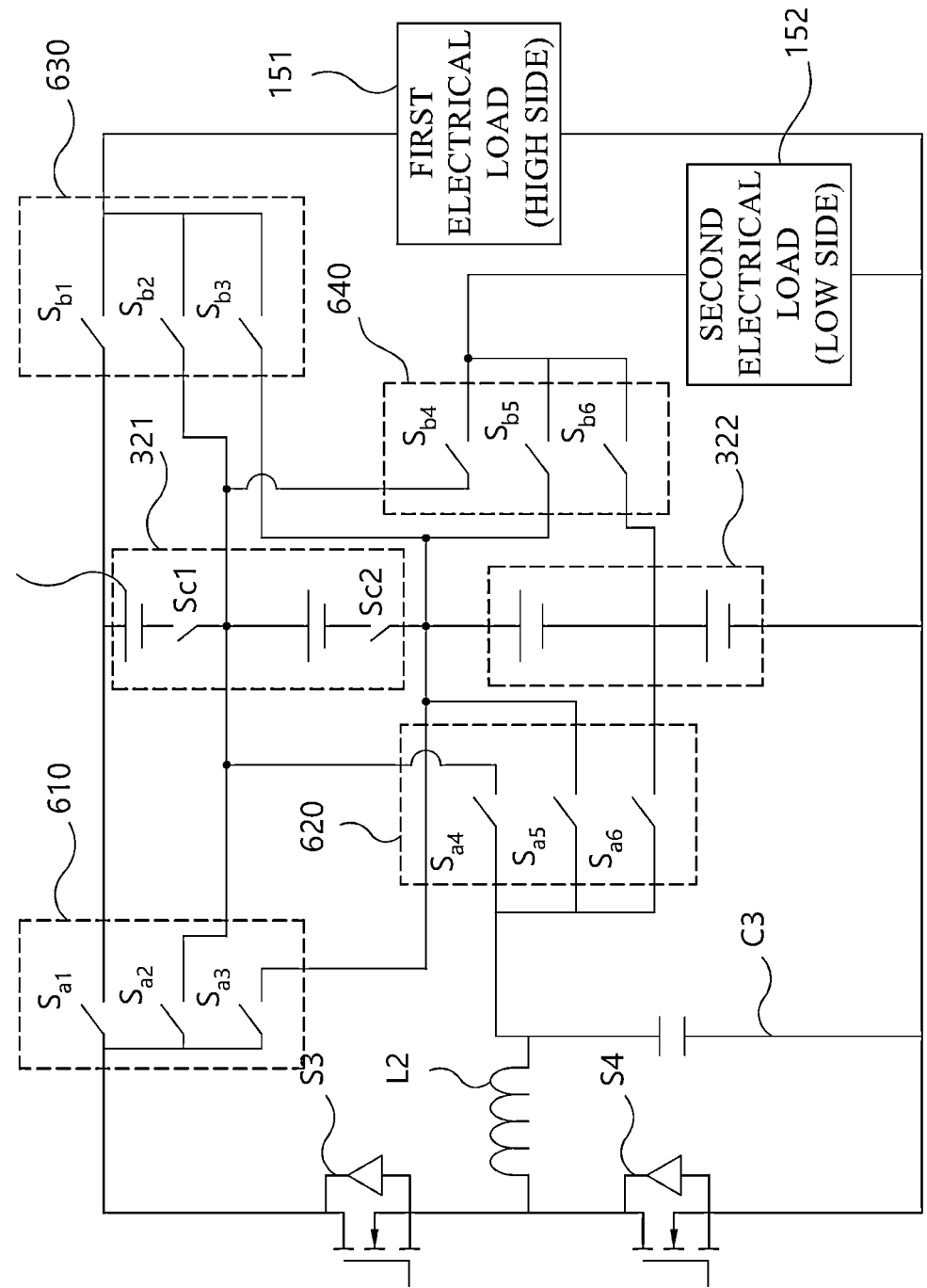
FIG. 6 is a block diagram showing a detailed configuration of a low voltage conversion module shown in FIG. 2.

FIG. 6 is a block diagram showing a detailed configuration of the low voltage conversion module 220 shown in FIG. 2. In particular, FIG. 6 is a diagram showing the configuration of the energy storage element 222. FIG. 6 shows an example in which the first auxiliary battery 321 and the second auxiliary battery 322 are composed of four battery cells 601 with about 12 V. Of course, the first auxiliary battery 321 and the second auxiliary battery 322 are shown to aid in understanding the present disclosure. Therefore, the number of battery cells included in the first auxiliary battery 321 and the second auxiliary battery 322 can vary according to ON/OFF of the switching elements ($S_{a1}$ to $S_{a6}$, $S_{c1}$ and $S_{c2}$, and $S_{b1}$ to $S_{b6}$).

In other words, a first input switching block 610 is disposed between the output terminal of the high voltage converter 210 and the first auxiliary battery 321. Further, a second input switching block 620 is disposed between the output terminal of the integrated converter 221 and the second auxiliary battery 322. In addition, first and second cell switching elements ($S_{c1}$, $S_{c2}$) are disposed between some battery cells 601. In addition, a first output switching block 630 is disposed between the first auxiliary battery 321 and the first electric part load 151 and a second output switching block 640 is disposed between the second auxiliary battery 322 and the second electric part load 152.

Therefore, various output voltages can be generated by dividing and configuring the battery cells 601 as follows:

$S_{a1}, S_{b1}+S_{a6}, S_{b6}+S_{c1}, S_{c2}$(ON)/remaining switching elements(OFF)=>configuration of outputting 48 V,12 V      1)

$S_{a2}, S_{b2}+S_{a5}, S_{b5}+S_{c2}$(ON)/remaining switching elements(OFF)=>configuration of outputting 36 V,24 V      2)

Multiple outputs in a unit of 12 V are possible through the ON/OFF combination of the switching elements in the above method. Of course, FIG. 6 is merely an example. It is also possible to use a 6 V battery cell, an integrated circuit (IC), a chip, and the like without using the switching elements.

In addition, some of the steps of the method or algorithm described in connection with the embodiments disclosed herein can be implemented in the form of program instructions that can be performed through various computer means such as a microprocessor, a processor, and a central processing unit (CPU) and recorded on a computer-readable medium such as a non-transitory memory. The computer-readable medium can include program (instruction) codes, data files, data structures, and the like, either alone or in combination.

The program (instruction) code recorded on the medium can be ones specially designed and configured for the present disclosure, or also be ones known and available to those having ordinary skill in the art of computer software. Examples of computer-readable recording media can include: magnetic media such as a hard disk, a floppy disk, and a magnetic tape; optical media such as a compact disc-ROM (CD-ROM), a digital video disc (DVD), and a Blu-ray; and semiconductor memory elements specially configured to store and execute the program (instruction) code such as a ROM, a RAM, and a flash memory.

Here, examples of the program (instruction) code include high-level language codes that can be executed by a computer using an interpreter, and the like, as well as machine language codes such as those generated by a compiler. The aforementioned hardware devices can be configured to operate as one or more software modules to perform the operations of the present disclosure, and vice versa.

What is claimed is:

1. A multi-output power conversion apparatus comprising:
    a high voltage battery configured to output a first power; and
    a power conversion unit with multiple outputs configured to convert the first power into a second power and to convert the second power into a third power to supply it to each of a plurality of electric part loads with different power consumption magnitudes using an energy storage element configured to respond to the multiple outputs,
    wherein:
        the energy storage element is a type in which a plurality of battery cells is divided and configured to respond to the multiple outputs, wherein the multiple outputs include at least three level outputs including an intermediate level output,
        the power conversion unit uses characteristics of a buck booster converter topology and the multiple outputs include an intermediate level output, and
        the plurality of battery cells are operated as a sum or respectively using an ON/OFF combination of a plurality of switching elements to generate the intermediate level output, wherein the plurality of switching elements includes switching elements that are disposed between the battery cells and switching elements that are disposed between the electric part loads and the battery cells.

2. The multi-output power conversion apparatus of claim 1, wherein the power conversion unit comprises:
    a high voltage converter configured to convert the first power into the second power lower than the first power; and
    a low voltage conversion module configured to convert the second power into the third power equal to or lower than the second power.

3. The multi-output power conversion apparatus of claim 2, wherein the low voltage conversion module comprises:
    an integrated converter configured to convert the second power into the third power; and
    the energy storage element configured to store the third power as backup and to supply the stored third power to the plurality of electric part loads.

4. The multi-output power conversion apparatus of claim 3, wherein the energy storage element is disposed in the low voltage conversion module.

5. The multi-output power conversion apparatus of claim 3, wherein the energy storage element has at least two battery cells with the same chargeable capacity of the plurality of battery cells disposed in series to store the third power with the multiple outputs.

6. The multi-output power conversion apparatus of claim 5, wherein the at least two battery cells form a first auxiliary battery and a second auxiliary battery.

7. The multi-output power conversion apparatus of claim 6, wherein the switching elements include at least three switching elements that are disposed between the at least two battery cells connected in series.

8. The multi-output power conversion apparatus of claim 6, wherein the switching elements comprise:
    a first switching element disposed between an output terminal of the high voltage converter or an output terminal of the integrated converter and the battery cells; and
    a second switching element connected to either the first auxiliary battery or the second auxiliary battery.

9. The multi-output power conversion apparatus of claim 6, wherein the second auxiliary battery is connected to a first electric part load with low power consumption among the plurality of electric part loads.

10. The multi-output power conversion apparatus of claim 9, wherein the first auxiliary battery and the second auxiliary battery are connected to a second electric part load with high power consumption among the plurality of electric part loads in series.

11. The multi-output power conversion apparatus of claim 3, wherein the integrated converter comprises:
    the switching elements connected in series;
    an inductor connected to an intermediate node of the switching elements; and
    a capacitor connected to the inductor in series.

12. The multi-output power conversion apparatus of claim 2, wherein the high voltage converter is an active clamp-forward type converter for improving efficiency.

13. A multi-output power conversion method comprising:
    outputting a first power from a high voltage battery;

converting, by a power conversion unit with multiple outputs, the first power into a second power and converting, by the power conversion unit, the second power into a third power; and supplying, by the power conversion unit, the third power with multiple outputs to a plurality of electric part loads with different power consumption magnitudes using an energy storage element configured to respond to the multiple outputs, wherein:

the energy storage element is a type in which a plurality of battery cells is divided and configured to respond to the multiple outputs, wherein the multiple outputs include at least three level outputs including an intermediate level output, the power conversion unit uses characteristics of a buck booster converter topology and the multiple outputs include an intermediate level output, and the plurality of battery cells are operated as a sum or respectively using an ON/OFF combination of a plurality of switching elements to generate the intermediate level output, wherein the plurality of switching elements includes switching elements that are disposed between the battery cells and switching elements that are disposed between the electric part loads and the battery cells.

14. The multi-output power conversion method of claim 13, wherein the converting comprises:

converting, by a high voltage converter, the first power into the second power lower than the first power; and converting, by a low voltage conversion module, the second power into the third power equal to or lower than the second power.

15. The multi-output power conversion method of claim 14, wherein the converting of the second power comprises:

converting, by an integrated converter, the second power into the third power; and storing the third power in an energy storage element as backup and supplying the third power stored in the energy storage element to the plurality of electric part loads.

* * * * *